United States Patent
Takano et al.

(10) Patent No.: US 7,375,866 B2
(45) Date of Patent: May 20, 2008

(54) IMAGE PROCESSING SYSTEM AND METHOD FOR SCREENING

(75) Inventors: Gaku Takano, Yokohama (JP); Naofumi Yamamoto, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1133 days.

(21) Appl. No.: 10/259,841

(22) Filed: Sep. 30, 2002

(65) Prior Publication Data
US 2004/0061879 A1   Apr. 1, 2004

(51) Int. Cl.
*H04N 1/46* (2006.01)

(52) U.S. Cl. ............... 358/534; 358/533; 358/535; 358/536

(58) Field of Classification Search ............. 358/534, 358/533, 535, 536, 3.19
See application file for complete search history.

(56) References Cited

U.S. PATENT DOCUMENTS

| | | | | |
|---|---|---|---|---|
| 5,394,252 A | * | 2/1995 | Holladay et al. | 358/533 |
| 5,519,794 A | * | 5/1996 | Sandor et al. | 382/285 |
| 6,019,457 A | * | 2/2000 | Silverbrook | 347/65 |
| 6,067,406 A | * | 5/2000 | Van Hoof et al. | 358/1.9 |
| 2001/0030769 A1 | * | 10/2001 | Jacobs | 358/429 |
| 2003/0025954 A1 | | 2/2003 | Takano et al. | |

FOREIGN PATENT DOCUMENTS

JP   4-198936 A   7/1992

OTHER PUBLICATIONS

Henry R. Kang, "Digital Color Halftoning", 1999, pp. 174-175.

* cited by examiner

*Primary Examiner*—Houshang Safaipour
(74) *Attorney, Agent, or Firm*—Foley & Lardner LLP

(57) ABSTRACT

A system and method for printing an image on a document by generating RGB data from a scanned image, converting the RGB data to CMYK data and identifying one of a first and a second type of screening. The type of screening is identified for a first one of the CMYK data based upon the density of the first one of the CMYK data and the density of at least one of the other CMYK data.

15 Claims, 6 Drawing Sheets

IMAGE PROCESSING SYSTEM AND METHOD FOR SCREENING

FIELD OF INVENTION

The present invention relates generally to image processing, and more particularly to a system and method for adjusting screening methods according to input levels for improved image printing.

BACKGROUND OF THE INVENTION

Hardcopy devices, such as photocopiers, scanners and printers, are capable of reproducing color images from color documents and photographs. To reproduce the color images, the images from the color documents or photographs are sensed and reproduced based upon tri-stimulus values, whose amplitude is proportional to radiance, but whose spectral composition is carefully chosen according to the principles of color science. Tri-stimulus values in typical imaging systems are represented as red, green and blue (RGB), which are linear light values. In the typical imaging systems, the RGB tri-stimulus values are subjected to a nonlinear transfer function, such as gamma correction, that mimics the lightness response of vision. The resulting non-linear light values may be represented as R'G'B' tri-stimulus values.

A digitized color image is represented as an array of pixels, where each pixel contains numerical components that define a color. The systems that may be used for image coding include the linear RGB and nonlinear R'G'B' systems described above. Other image coding systems include nonlinear cyan, magenta and yellow (CMY), nonlinear CMY and black (CMYK), and derivatives of these coding systems. Cyan with magenta produces blue, cyan with yellow produces green and yellow with magenta produces red. The CMY values are typically derived from the RGB or R'G'B' values, and the K value is typically derived from the CMY values. After an image is scanned, RGB data is generated and can be converted to CMY data and/or CMYK data.

SUMMARY OF INVENTION

Briefly, in one aspect of the present invention, a method for printing an image on a document includes generating RGB data from a scanned image, converting the RGB data to CMYK data, and identifying one of a first and a second type of screening for a first one of the CMYK data based upon the density of the first one of the CMYK data and the density of at least one of the other CMYK data.

Another aspect of the present invention is a hardcopy device for printing an image on a document. The hardcopy device includes a processor and a memory coupled to the processor. The memory includes a plurality of instructions executed by the processor. The plurality of instructions are configured to generate RGB data from a scanned image, convert the RGB data to CMYK data, and identify one of a first and a second type of screening for a first one of the CMYK data based upon the density of the first one of the CMYK data and the density of at least one of the other CMYK data.

BRIEF DESCRIPTION OF THE DRAWINGS

The accompanying drawings, which are incorporated in and constitute a part of the specification, illustrate an embodiment of the present invention, and, together with the general description given above and the detailed description of the embodiment given below, serve to explain the principles of the invention.

DETAILED DESCRIPTION OF THE PREFERRED EMBODIMENTS

Figure 1:
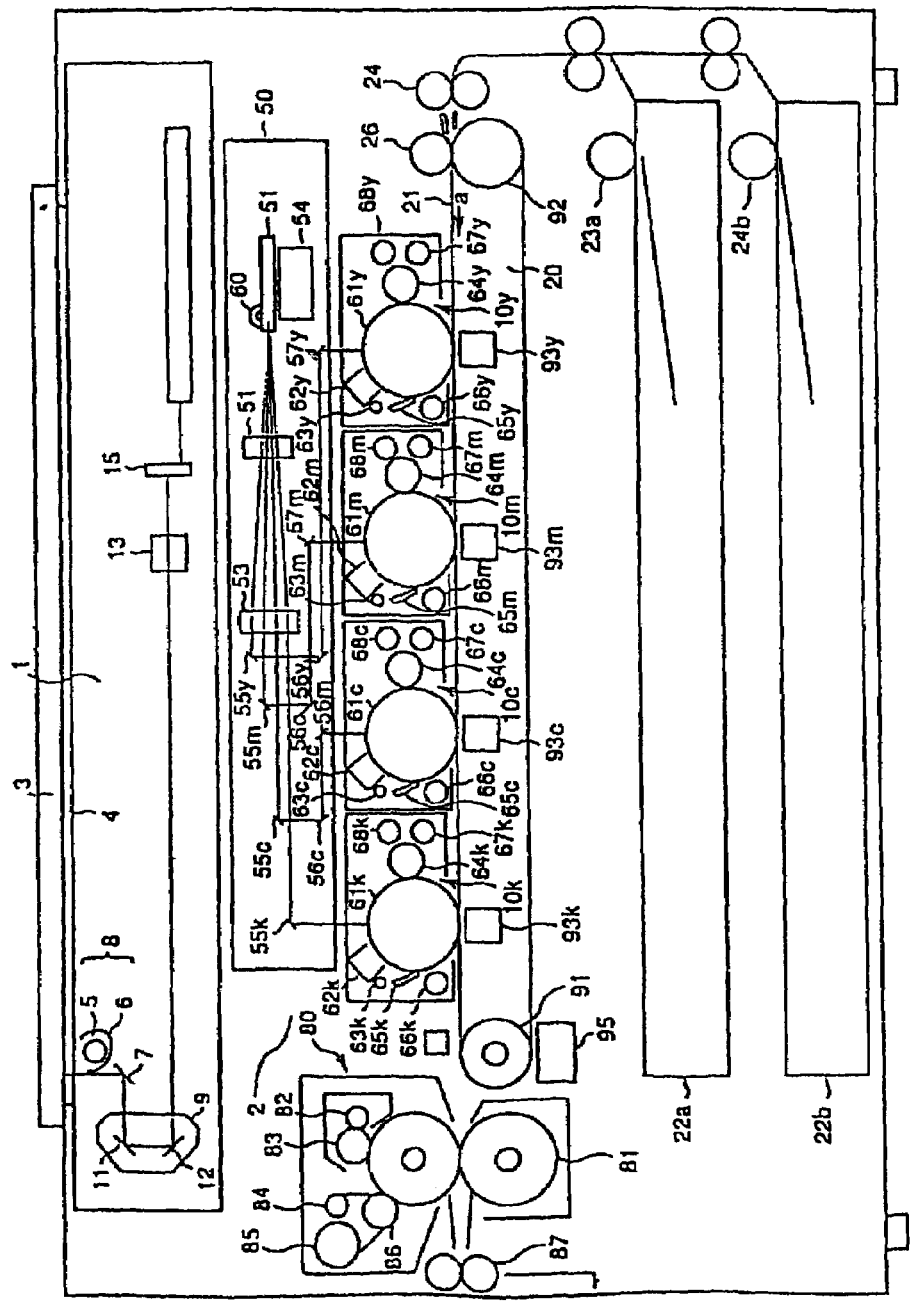
FIG. 1 is a block diagram of an image forming apparatus consistent with the present invention.

FIG. 1 shows a block diagram of an image forming apparatus consistent with the present invention. The image forming apparatus may be a hardcopy device such as a digital type color copier for forming a copied image of a color image. As shown in FIG. 1, the image forming apparatus includes a color scanner portion 1, which scans and reads a color image on a document and a color printer portion 2, which forms a copied image of the color image.

The color scanner portion 1 includes a document base cover 3 at an upper portion thereof. A document base 4 is arranged opposite to the document base cover 3 in a closed state and includes transparent glass on which the document is set. On a lower side of the document base 4 are arranged an exposure lamp 5 for illuminating the document mounted on the document base 4, a reflector 6 for focusing light from the exposure lamp 5 to the document and a first mirror 7 for reflecting the light from the document. The exposure lamp 5, the reflector 6 and the first mirror 7 are fixed to a first carriage 8. The first carriage 8 is moved by a pulse motor, not illustrated, along a lower face of the document base 4.

A second carriage 9 is arranged in a direction in which the light is reflected by the first mirror 7 and provided movably in parallel with the document base 4 via a drive mechanism, such as a belt with teeth in conjunction with a direct current motor or the like. The second carriage 9 includes a second mirror 11 for reflecting the light from the first mirror 7 to a third mirror 12. The third mirror 12 then reflects the light from the second mirror 11. The second carriage 9 is driven by the first carriage 8 and is moved along the document base 4 in parallel therewith at half the speed of the first carriage 8.

A focusing lens 13 focuses the light reflected from the third mirror 12 by a predetermined magnification. A CCD type color image sensor or photoelectric conversion element 15 converts the reflected light focused by the focusing lens 13 into an electric signal.

When light from the exposure lamp 5 is focused on the document on the document base 4 by the reflector 6, the reflected light from the document is made to be incident on the color image sensor 15 via the first mirror 7, the second mirror 11, the third mirror 12 and the focusing lens 13. At the color image sensor 15, the incident light is converted into an electric signal in accordance with the three primary colors of light of R (red), G (green) and B (blue).

The color printer portion 2 includes first through fourth image forming portions 10y, 10m, 10c and 10k. These image forming portions form images that are subjected to color decomposition for respective color components. In particular, the images are decomposed into the four colors of yellow (y), magenta (m), cyan (c) and black (k) according to known decomposition methods, such as the subtractive mixing method.

A transfer mechanism 20, which includes a transfer belt 21, transfers the images of the respective colors formed by the respective image forming portions in a direction shown by the arrow marked "a" in FIG. 1. The transfer belt 21 is wound to expand between a drive roller 91 rotated by a motor in the direction shown by the arrow marked "a," and a drive roller 92 separated from the drive roller 91 by a predetermined distance rotating at a constant speed in the direction of the arrow marked "a." The image forming portions 10y, 10m, 10c and 10k are arranged in series along a transfer direction of the transfer belt 21.

The image forming portions 10y, 10m, 10c and 10k include photosensitive drums 61y, 61m, 61c and 61k, respectively, as image carriers. Outer peripheral faces of the drums are formed in the same direction at respective positions in contact with the transfer belt 21. The photosensitive drums 61y, 61m, 61c and 61k are rotated at a predetermined speed by a motor.

The photosensitive drums 61y, 61m and 61c and 61k are arranged such that their axis lines are respectively disposed at equal intervals and are arranged such that the axis lines are orthogonal to the direction that the images are transferred by the transfer belt 21. The directions of the axis lines of the photosensitive drums 61y, 61m, 61c and 61k are defined as main scanning directions (second direction). The rotational directions of the photosensitive drums 61y, 61m, 61c and 61k, which correspond to a rotational direction of the transfer belt 21 (the arrow marked "a"), are defined as sub-scanning directions (first direction).

Electricity charging apparatus 62y, 62m, 62c and 62k, electricity removing apparatus 63y, 63m, 63c and 63k and developing rollers 64y, 64m, 64c and 64k are all extended in the main scanning direction. Lower agitating rollers 67y, 67m, 67c and 67k, upper agitating rollers 68y, 68m, 68c and 68k, transcribing apparatus 93y, 93m, 93c and 93k, and cleaning blades 65y, 65m, 65c and 65k also extend in the main scanning direction. Discharged toner recovery screws 66y, 66m, 66c and 66k are arranged successively along the rotational direction of the photosensitive drums 61y, 61m, 61c and 61k.

Transcribing apparatus 93y, 93m, 93c and 93k are arranged at positions sandwiching the transfer belt 21 between them. Corresponding ones of the photosensitive drums 61y, 61m, 61c and 61k are arranged on an inner side of the transfer belt. Further, exposure points by an exposure apparatus 50 are respectively formed on the outer peripheral faces of the photosensitive drums 61y, 61m, 61c and 61k between the electricity charging apparatus 62y, 62m, 62c and 62k and developing rollers 64y, 64m, 64c and 64k.

Sheet cassettes 22a and 22b are arranged on a lower side of the transfer mechanism 20 and contain sheets of the sheet P as image forming media for transcribing images formed by the respective image forming portions 10y, 10m, 10c and 10k. Pickup rollers 23a and 23b are arranged at end portions on one side of the sheet cassettes 22a and 22b and on sides thereof proximate to the drive roller 92. Pickup rollers 23a and 23b pick up the sheet P contained in the sheet cassettes 22a and 22b sheet by sheet from topmost portions of the sheets. A register roller 24 is arranged between the pickup rollers 23a and 23b and the drive roller 92. The register roller 24 matches a front end of the sheet P picked from the sheet cassette 22a or 22b and a front end of a toner image formed at the photosensitive drum 61y of the image forming portion 10y. Toner images formed at the other photosensitive drums 61y, 61m and 61c are supplied to respective transcribing positions in conformity with transfer timings of the sheet P transferred on the transfer belt 21.

An adsorbing roller 26 is arranged between the register roller 24 and the first image forming portion 10y, at a vicinity of the drive roller 92, such as above an outer periphery of the drive roller 92 substantially pinching the transfer belt 21. The adsorbing roller 26 provides electrostatic adsorbing force to the sheet P transferred at predetermined timings via the register roller 24. The axis line of the adsorbing roller 26 and the axis line of the drive roller 92 are set to be in parallel with each other.

A positional shift sensor is arranged at one end of the transfer belt 21, and at a vicinity of the drive roller 91, such as above an outer periphery of the drive roller 91 substantially pinching the transfer belt 21. The positional shift sensor detects a position of the image formed on the transfer belt 21. The positional shift sensor may be implemented, for example, as a transmitting type or a reflecting type optical sensor.

A transfer belt cleaning apparatus 95 is arranged on an outer periphery of the drive roller 91 and above the transfer belt 21 on the downstream side of the positional shift sensor 96. The transfer belt cleaning apparatus 95 removes toner or paper dust off the sheet P adhered onto the transfer belt 21.

A fixing apparatus 80 is arranged to receive the sheet P when it detaches from the transfer belt 21 and transfers the sheet P further. The fixing apparatus 80 fixes the toner image on the sheet P by melting the toner image transcribed onto the sheet P by heating the sheet P to a predetermined temperature. The fixing apparatus 80 includes a pair of heat rollers 81, oil coating rollers 82 and 83, a web winding roller 84, a web roller 85 and a web pressing roller 86. After the toner formed on the sheet P is fixed to the sheet, the sheet P is discharged by a paper discharge roller pair 87.

The exposure apparatus 50 forms electrostatic latent images subjected to color decomposition on the outer peripheral faces of the photosensitive drums 61y, 61m, 61c and 61k. The exposure apparatus is provided with a semiconductor laser oscillator 60 controlled to emit light based on image data (Y, M, C, K) for respective colors subjected to color decomposition by an image processing apparatus 36.

On an optical path of the semiconductor laser oscillator 60, there are successively provided a polygonal mirror 51 rotated by a polygonal motor 54 for reflecting and scanning a laser beam light and fθ lenses 52 and 53 for correcting and focusing a focal point of the laser beam light reflected via the polygonal mirror 51. First folding mirrors 55y, 55m, 55c and 55k are arranged between the fθ lens 53 and the photosensitive drums 61y, 61m, 61c and 61k. The first folding mirrors 55y, 55m, 55c and 55k fold or reflect the laser beam light of respective colors that have passed through the fθ lens 53 toward the exposure positions of the photosensitive drums 61y, 61m, 61c and 61k. Second and third folding mirrors 56y, 56m, 56c and 57y, 57m and 57c further fold or reflect the laser beam light folded by the first folding mirrors 55y, 55m and 55c. The laser beam light for black is folded or reflected by the first folding mirror 55k and thereafter guided onto the photosensitive drum 61k without detouring other mirrors.

Screening is a process in which a continuous tone image is transformed to a modulated image. The image can be stored in a memory or sent to an output device, such as a printer for printing the image. The screening process can also be referred to as spatial dithering and half-toning. There are also several types of screening, including circle-dot screening, line type screening, clustered-dot screening and dispersed-dot screening.

Figure 2A:
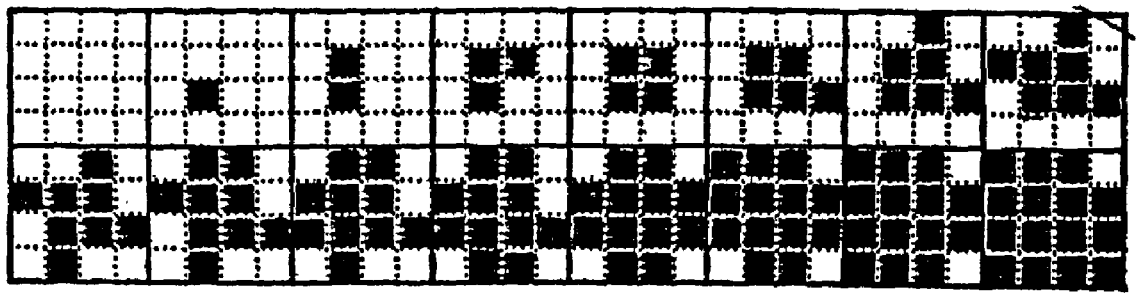
FIGS. 2A and 2B provide examples of representations of two different screening types.
Figure 2B:
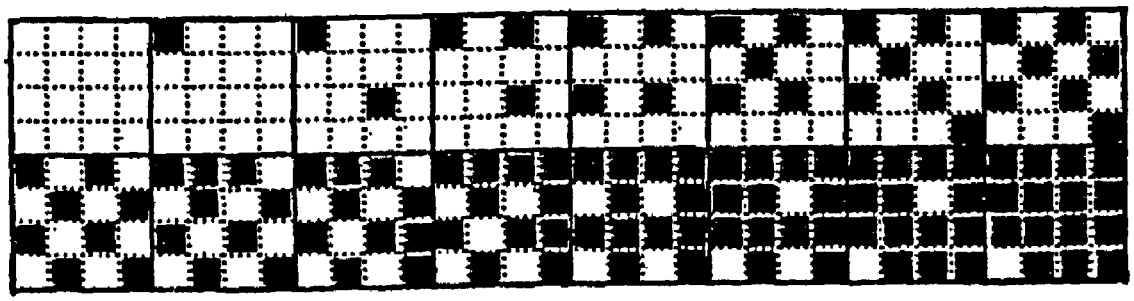

FIGS. 2A and 2B provide examples of representations of two different screening types. FIG. 2A is an example of clustered-dot screening, and FIG. 2B is an example of dispersed-dot screening. In clustered-dot screening, dots are increasingly connected to each other in proportion to the input density. In contrast, the dots are increasingly scattered in dispersed-dot screening In an adaptive screening process, different screening types can be used for each particular image data. When an adaptive screening method is applied to a system with CMYK data, the adaptive screening method can be executed independently for each of the four different colors, i.e., the method can be performed for Cyan, Magenta, Yellow and Black individually. In a conventional system, the screening type method applied to each color is only dependent on the input level of its corresponding color. For example, a first type of screening is used when the input level is low density and a second type of screening is used when the input level is high density. Determining the screening type for a color based on only the input level of that color can result in a variety of screening types being applied when reproducing the image from the CMYK data. In some circumstances, the combination of screening types that are used in accordance with this determination can result in noisy images.

Consistent with the present invention, an adaptive screening method and system provides for improved image reproduction. In one aspect of the present invention, the screening type chosen for a color is dependent on the input level of that color and the input level of at least one of the other colors. In this aspect of the present invention, two types of screening can be used, although those skilled in the art will understand that the number of types of screening can be expanded to more than two types. The first type of screening can be a circle-dot type of screening, and the second type of screening can be a line-type screening. It should be understood that other types of screening can also be used.

Figure 3A:
FIG. 3A shows an example of line-type screening.

Line type screening comprises lines of various periods in space, and formed at a variety of angles. The amount of lines per inch (LPI) is approximately equal to the amount of cycles per inch (CPI). The LPI and the angles of the lines can be different for each color. The ratio of the width of the line to the period (line width/period) is proportional to the color density, which typically ranges from 0 to 255. A high CPI results in a high resolution but often a noisy image. A low CPI results in a more stable image. FIG. 3A shows an example of line-type screening. As shown in FIG. 3A, the line type screen has an angle of 90 degrees, and has an increasingly higher density from top to bottom.

Figure 3B:
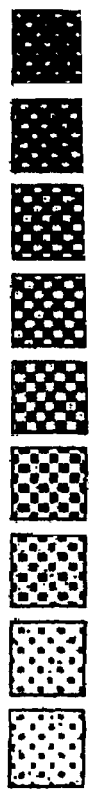
FIG. 3B shows an example of circle-dot type screening.

FIG. 3B shows an example of circle-dot type screening. In circle-dot screening, the radius of the screening dots, which are periodical circular points, increase in size in proportion to the input density. As shown in FIG. 3B, the input density of the screening dots increases from top to bottom.

Figure 4:
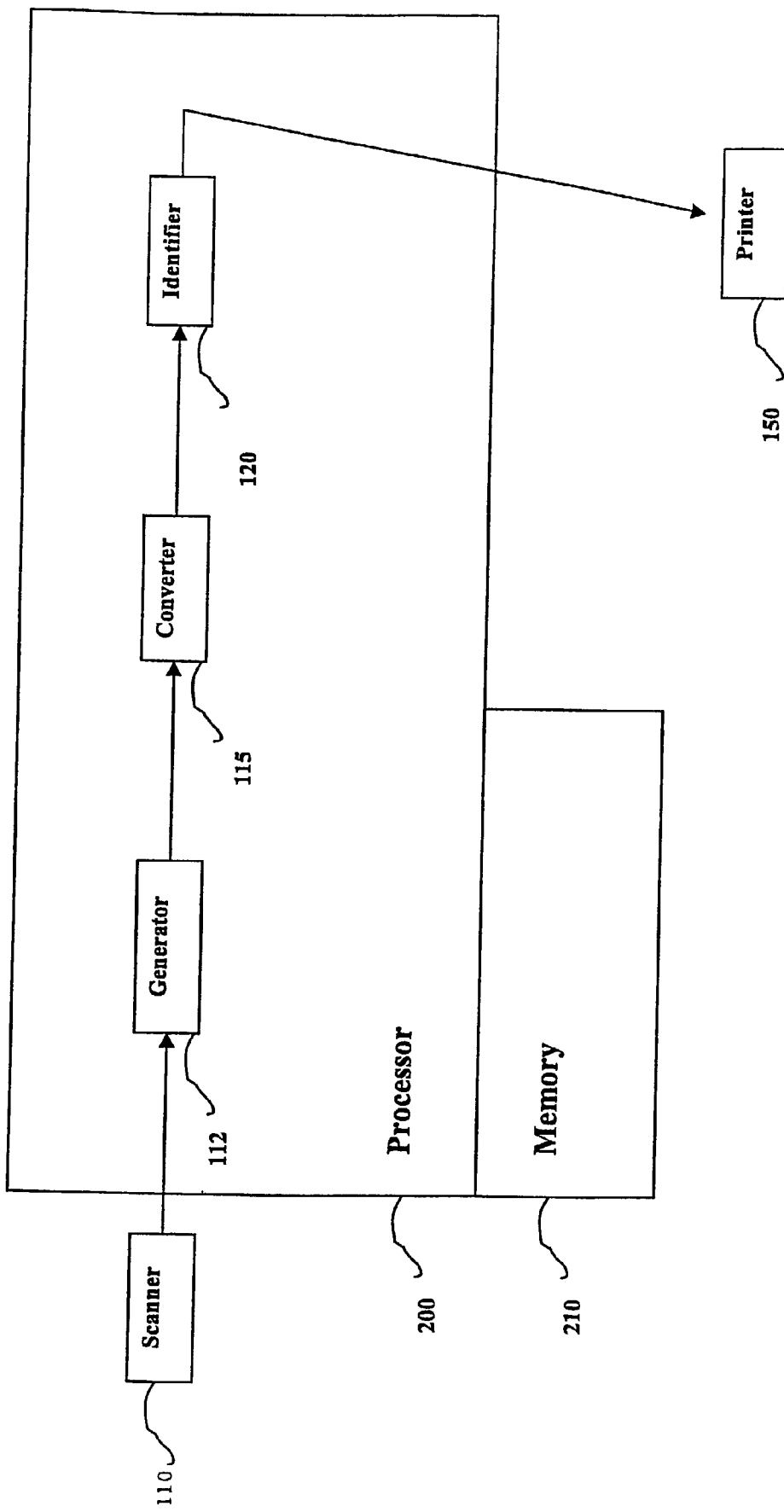
FIG. 4 is a block diagram of an image processing system consistent with the present invention.

FIG. 4 is a block diagram of an image processing system consistent with the present invention. As shown in FIG. 4, the image processing system includes a processor 200, a memory 210, a scanner 110, a generator 112, a converter 115, an identifier 120, and a printer 150. The processor 200 is coupled to the memory 210. The memory 210 includes a plurality of instructions executed by the processor 200 to perform a variety of image processing functions. The functions performed by the processor 200 include the functions of the generator 112, the converter 115 and the identifier 120. The generator 112, the converter 115 and the identifier 120 can be separate modules controlled by the processor to perform their respective functions. Alternatively, these function modules may be representative of the functions performed by the processor. The function and operation of each of the remaining elements of the image processing system will be explained in conjunction with the image processing method of FIG. 5.

Figure 5:
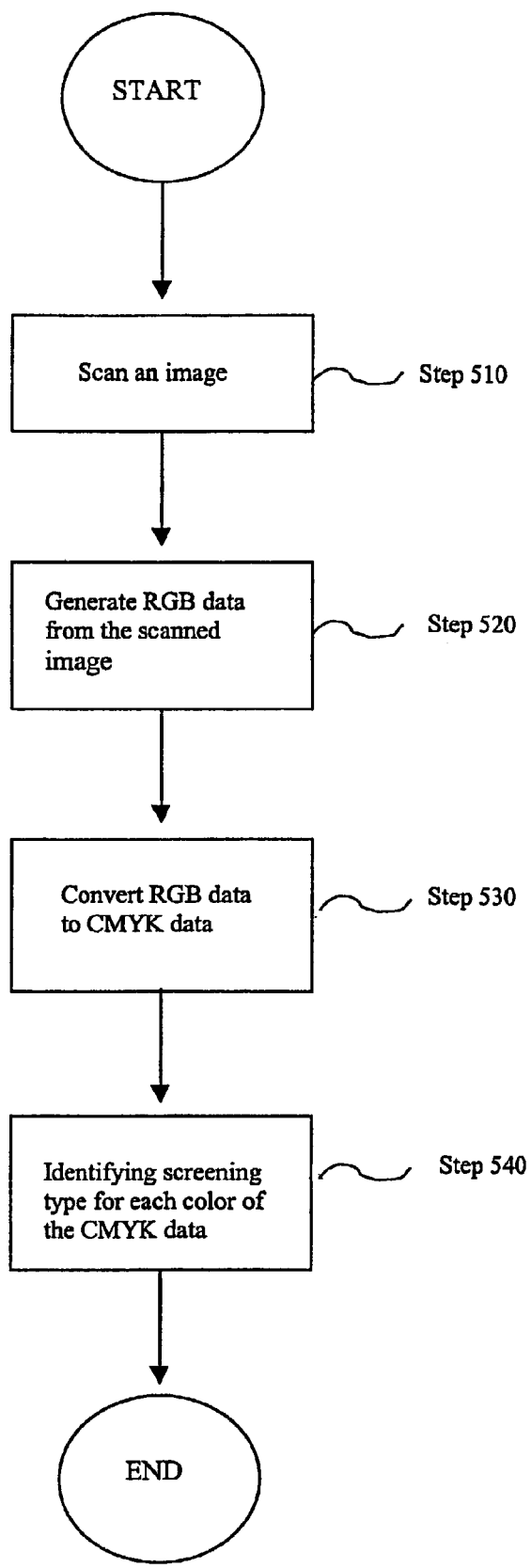
FIG. 5 is a flow diagram for an image processing method consistent with the present invention.

FIG. 5 is a flow diagram for an image processing method consistent with the present invention. As shown in FIG. 5, the first step in the image processing method is to scan an image (step 510). To scan the image, a user places a document having an image on a scanning surface of the scanner 110, and the scanner 110 scans the document placed on the scanning surface. The scanner 110 may include a laser and optical system to scan the document on the scanning surface. The scanner 110 may be an independent device that provides color image data to a computer system. Alternatively, the scanner 110 may be part of a multi-functional device, such as a combination scanner and printer. For example, a digital printer can include the scanner 110.

The scanned image is used to generate RGB data (step 520). The scanned image is sent to the generator 112 where the RGB data is generated. The RGB data includes all of the pixels of the scanned image, where each pixel has an R value, a G value and a B value. Each value represents a tone level. For each value, there may be 256 tone levels, although more or fewer tone levels can be used as well, depending on the resolution setting of the scanner 110.

The RGB data is converted to CMYK data (step 530). The conversion of the RGB data to CMYK data can be performed by the converter 115. The conversion of RGB data into CMYK data is a standard translation understood by one skilled in the art. In performing the conversion of RGB data into CMYK data, it is possible to translate the RGB data into one or more intermediate formats before translating into CMYK data.

The CMYK data is received by the identifier 120. The identifier 120 identifies the screening type used for each color of the CMYK data (step 540). The screening type selected for each color of the CMYK data is determined from its respective density level and the density of at least one other color of the CMYK data. To output the processed image, the image is sent to the printer 150.

The generator 112, converter 115 and identifier 120 may be implemented in hardware, in software or some combination thereof. For example, they may be implemented as integrated circuits or as part of a software application operating on a computing device. The computing device may be the scanner 110, the printer 150, a person computer (PC), some combination of these devices, or any other device capable of receiving, processing and transmitting image data.

To select the screening type, the density values can be compared to one or more threshold values. Depending upon the relationship of the density values to the thresholds, a particular type of screening is selected. The threshold values can be determined in several ways. For example, the threshold value can be determined by trial and error. Various values are chosen and tested, and the best results lead to the discovery of the best performing threshold value.

In one aspect of the present invention, to determine the applicable screening type for a particular color of the CMYK data, a first threshold value can be used for comparison to the density level (i.e., input level) of that color, and a second threshold value can be used for comparison to the density level or levels of the at least one other color of the CMYK data. A root of the sum of the squares can be used to make the comparison to the at least one other color of the CMYK data. To calculate the root of the sum of the squares, the data values are squared, added to one another, and the root of the sum is determined, whereby the root of the sum of the squares is compared to the second threshold value. The first and second threshold values can be determined as described above. In one embodiment of the invention, if both the particular CMYK data and the root of the sum of the squares of the other CMYK data are less than their respective threshold values, then a first screening type is used. If this is not the case, then a second screening type is used.

Other tests can be used for the threshold values. For example, to avoid visual obstruction, only one color would be subject to selecting the first or second type of screening. The particular color subject to the screening can be the minimum color level of the CMYK data. For example, if C=10, M=20, Y=25 and K=30, then cyan would be the color subject to the adjustable screening. M, Y and K would by screened by one type, and the C value would be compared to the threshold. If the C value is less than the threshold, then cyan would be screened by the first type; otherwise cyan would be screened by the second type.

In another aspect of the present invention, a single threshold can be used. To determine the screen type for a particular color of the CMYK data, a value is determined from the density level of the particular color and the density levels of at least one other color. A greater weighting can be given to the density level of the particular color to determine the value, which is then compared to the single threshold value to determine the applicable screening type for the particular color.

In one aspect of the present invention, the first screening type is circle dot, and the second screening type is line type screening. When the density level is low, the circle dot screening type usually produces a stable image, whereas the line type screening makes an unstable image. On the other hand, when the density level is high, the circle dot screening makes a visually obstructed image, but the line type screening makes a less visually obstructed image due to its higher resolution. It is also possible to use screening types other than the circle dot and line type screening methods.

Figure 6:
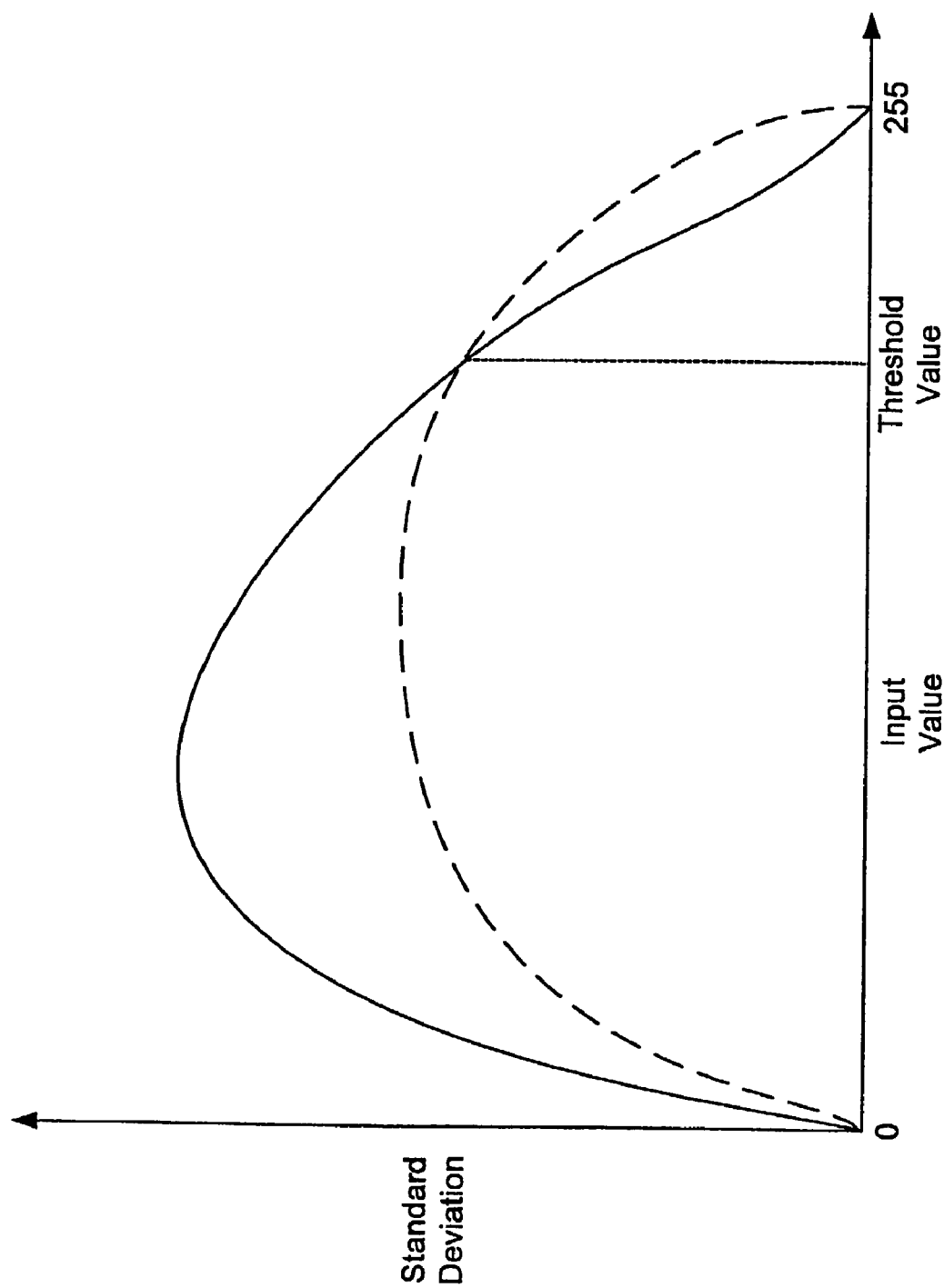
FIG. 6 is a graphical representation of the standard deviation of first and second screen types.

To determine the threshold, a standard deviation of the image density can be used as a measurement of reproduction stability. The reproduced image is more stable when the standard deviation is lower. FIG. 6 is a graphical representation of the standard deviation of first and second screen types. The first screen type can be a circle-dot type screening, and the second screen type can be a line type screening. As shown in the graph, there is a cross point between the two screen types. Before the cross point, the first screen type has the lower standard deviation, and thus the better stability. After the cross point, the second screen type has the lower standard deviation and the better stability. The cross point can be chosen, in one aspect of the present invention, as the threshold between using the first or second screen type.

In another aspect of the present invention for identifying the screen type for each color of the CMYK data, each CMYK data is analyzed and a determination is made on which color of the CMYK data is at a minimum. The CMYK data that is at a minimum uses the first type of screening, such as circle dot type screening. The other CMYK data uses the second type of screening, such as line type screening. If two or more CMYK data are equal in quantities, a priority scheme can be devised to determine which CMYK data is the minimum. For example, magenta can have the highest priority, then cyan, then black and finally yellow. This order is merely exemplary, and the order of the CMYK data priority can be in any order and any combination.

None of the embodiments of the present invention are limited to any particular type of screening. The screening types mentioned were mentioned only for the purpose of example.

Other embodiments of the present invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A method for printing an image on a document comprising:
   generating RGB data from a scanned image;
   converting the RGB data to CMYK data;
   identifying one of a first and a second type of screening for a first one of the CMYK data based upon the density of the first one of the CMYK data and the density of at least one of the other CMYK data;
   comparing the density of the first one of the CMYK data to a first predetermined threshold value; and
   comparing a root of a sum of squares of the other CMYK data to a second predetermined threshold value.

2. The method according to claim 1, further comprising comparing the density of the first one of the CMYK data to a predetermined threshold value.

3. The method according to claim 1, wherein if the density of the first one of the CMYK data is less than the first predetermined threshold value, and the root of the sum of the squares of the other CMYK data is less than the second predetermined threshold value, the first type of screening is used.

4. The method according to claim 3, wherein if the density of the first one of the CMYK data is greater than the first predetermined threshold value, the second type of screening is used, and
   wherein the first type of screening and the second type of screening are different.

5. The method according to claim 3, wherein if the root of the sum of the squares of the other CMYK data is greater than the second predetermined threshold value, the second type of screening is used, and
   wherein the first type of screening and the second type of screening are different.

6. The method according to claim 1, wherein the first and second predetermined threshold values are determined by testing multiple values.

7. The method according to claim 1, further comprising determining which one of the CMYK data is at a minimum.

8. The method according to claim 7, wherein the minimum CMYK data uses the first type of screening, and the other CMYK data uses the second type of screening, and
   wherein the first type of screening and the second type of screening are different.

9. The method according to claim 1, wherein the first and second types of screening are a respective one of circle dot screening, line type screening, and random dot screening, and
   wherein the first type of screening and the second type of screening are different.

10. A hard copy device for printing an image on a document, comprising:

a processor; and a memory, coupled to the processor, comprising a plurality of instructions executed by the processor, the plurality of instructions configured to:

generate RGB data from a scanned image;

convert the RGB data to CMYK data;

identify one of a first and a second type of screening for a first one of the CMYK data based upon the density of the first one of the CMYK data and the density of at least one of the other CMYK data:

compare the density of the first one of the CMYK data to a first predetermined threshold value; and compare a root of a sum of squares of the other CMYK data to a second predetermined threshold value.

11. The device according to claim 10, wherein if the density of the first one of the CMYK data is less than the first predetermined threshold value, and the root of the sum of the squares of the other CMYK data is less than the second predetermined threshold value, the first type of screening is used.

12. The device according to claim 10, wherein if the density of the first one of the CMYK data is greater than the first predetermined threshold value, the second type of screening is used, and wherein the first type of screening and the second type of screening are different.

13. The device according to claim 10, wherein the minimum CMYK data is determined.

14. The device according to claim 13, wherein the minimum CMYK data uses the first type of screening, and the other CMYK data uses the second type of screening, and wherein the first type of screening and the second type of screening are different.

15. The device according to claim 10, wherein the first and second types of screening are a respective one of circle dot screening, line type screening, and random dot screening, and wherein the first type of screening and the second type of screening are different.

* * * * *